United States Patent [19]
Lenker

[11] Patent Number: 5,090,644
[45] Date of Patent: Feb. 25, 1992

[54] CONDUIT SUPPORT APPARATUS

[76] Inventor: Scott J. Lenker, R.D. 1, Box 5024, Grantville, Pa. 17028

[21] Appl. No.: 619,594

[22] Filed: Nov. 29, 1990

[51] Int. Cl.$^5$ ............................................. F16L 5/00
[52] U.S. Cl. .................................. 248/56; 174/65 G; 174/153 G
[58] Field of Search ........................... 248/56, 74.1; 174/153 G, 65 G

[56] References Cited

U.S. PATENT DOCUMENTS

| | | | |
|---|---|---|---|
| 2,523,741 | 9/1950 | Weschler et al. | 248/56 |
| 3,056,852 | 10/1962 | Sachs | 174/153 G |
| 3,811,644 | 5/1974 | Arnault | 248/56 |
| 3,836,269 | 9/1974 | Koscik | 174/153 G X |
| 4,033,535 | 7/1977 | Moran | 248/56 |
| 4,193,604 | 3/1980 | Sarvanne | 248/56 X |
| 4,299,363 | 11/1981 | Datschefski | 248/56 |
| 4,656,689 | 4/1987 | Dennis | 248/56 X |

FOREIGN PATENT DOCUMENTS 2295287 7/1976 France ................................. 248/56

*Primary Examiner*—David L. Talbott
*Attorney, Agent, or Firm*—Leon Gilden

[57] ABSTRACT

An apparatus for aligning and securing a conduit directed through supports, such as walls, floors, and the like, wherein the apparatus includes a flange mounting a plurality of coaxially aligned mounting legs, each including a locking lug directed exteriorly of each leg, wherein the legs secure a conduit directed therebetween. The legs each include a concentric groove segment mounting a locking ring, wherein the locking ring includes a plurality of annularly oriented locking fingers, wherein the locking fingers are directed upwardly and define an acute included angle between the various plate elements of the locking ring and the defined central axis of the organization.

1 Claim, 4 Drawing Sheets

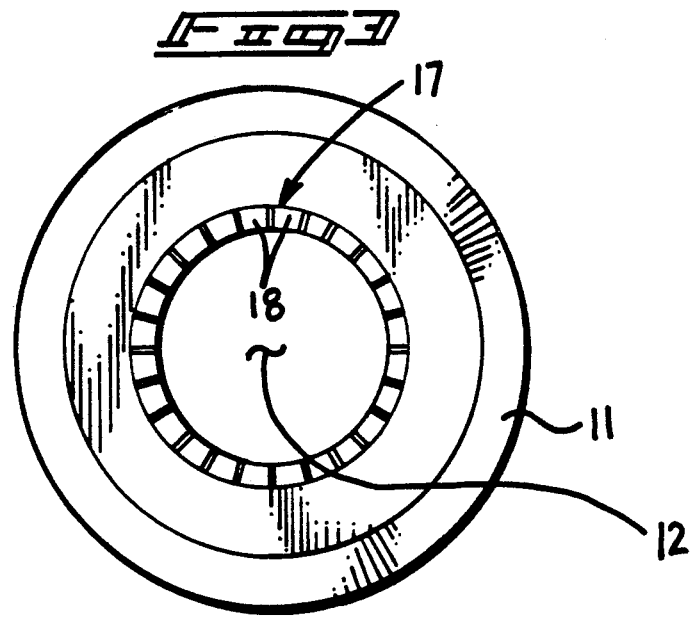
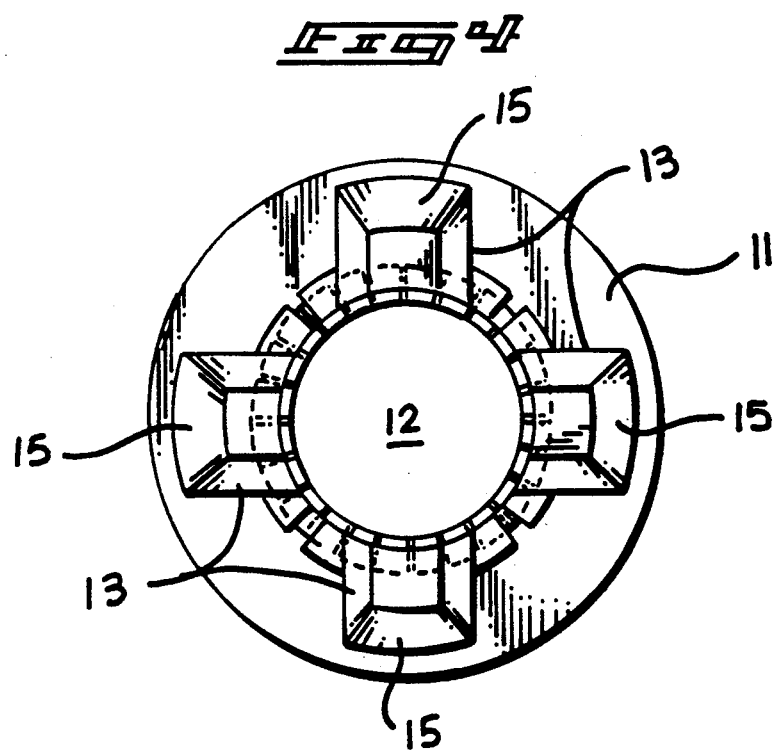

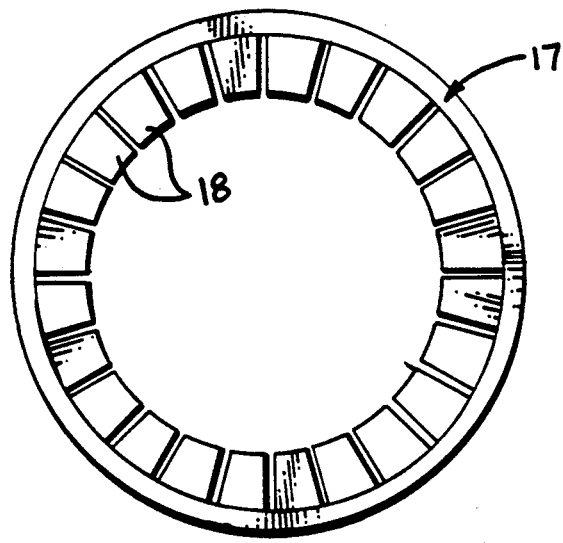
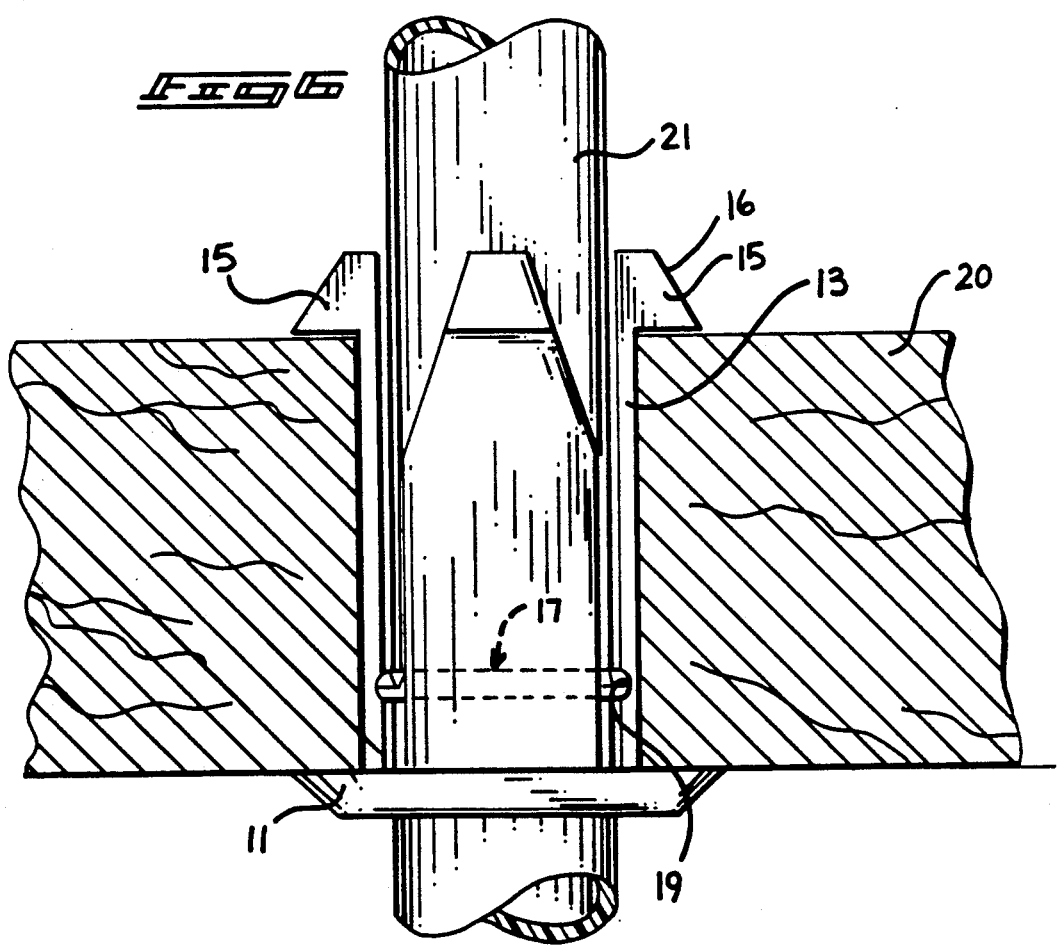

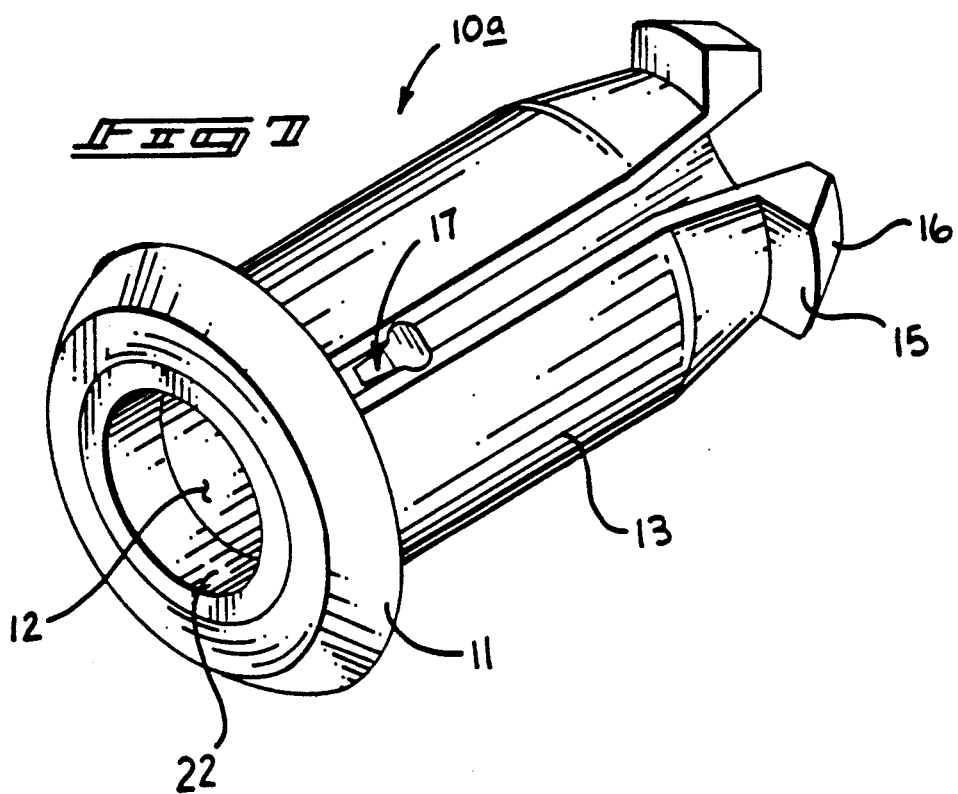
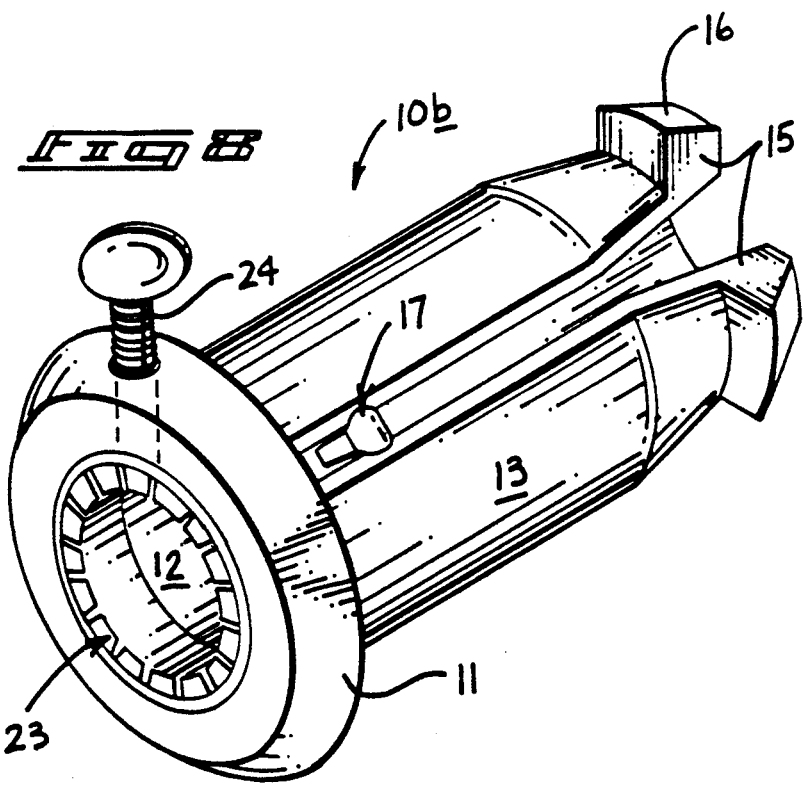

CONDUIT SUPPORT APPARATUS

BACKGROUND OF THE INVENTION

1. Field of the Invention

The field of invention relates to conduit alignment and support apparatus, and more particularly pertains to a new and improved conduit support apparatus wherein the same positions and secures a conduit within a floor or wall opening.

2. Description of the Prior Art

In the directing of various conduit, such as electrical conduit, plumbing, and the like through an overlying floor, the prior art has heretofore failed to provide a convenient locking structure as set forth by the instant invention which conveniently and effectively mounts within an opening within the floor and provides a self-locking internal surface. Various prior art conduit support structure has been set forth in the prior art, but has heretofore failed to provide the convenience and structural integrity of the instant organization. Examples of the prior art include U.S. Pat. No. 4,809,937 to Emory, Jr. sets forth a cable mounting plug mounting a cable and directing same through a wall surface, failing, however, to provide the concentrically arranged grasping finger structure as set forth by the instant invention.

U.S. Pat. No. 4,708,552 to Bustos, et al. sets forth an expansible mounting plug arranged for mounting a fastener within a bore of a wall support surface utilizing radially extending serrated portions to engage the bore of the wall surface.

U.S. Pat. No. 2,891,752 to Genter sets forth an example of wall anchor mounting fasteners therewithin.

U.S. Pat. No. 3,094,892 to Topf sets forth a further example of a wall anchor member, as does U.S. Pat. No. 2,854,824 to Curry, et al.

As such, it may be appreciated that there continues to be a need for a new and improved conduit support apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of conduit support apparatus now present in the prior art, the present invention provides a conduit support apparatus wherein the same coaxially aligns and frictionally engages a conduit tube directed through a coaxially bore of the apparatus. As such, the general purpose of the present invention which will be described subsequently in greater detail, is to provide a new and improved conduit support apparatus which has all the advantages of the prior art conduit support apparatus and none of the disadvantages.

To attain this, the present invention provides an apparatus for aligning and securing a conduit directed through supports, such as walls, floors, and the like, wherein the apparatus includes a flange mounting a plurality of coaxially aligned mounting legs, each including a locking lug directed exteriorly of each leg, wherein the legs secure a conduit directed therebetween. The legs each include a concentric groove segment mounting a locking ring, wherein the locking ring includes a plurality of annularly oriented locking fingers, wherein the locking fingers are directed upwardly and define an acute included angle between the various plate elements of the locking ring and the defined central axis of the organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved conduit support apparatus which has all the advantages of the prior art conduit support apparatus and one of the disadvantages.

It is another object of the present invention to provide a new and improved conduit support apparatus which may be easily and efficiently manufactured and marketed.

It is a further object of the present invention to provide a new and improved conduit support apparatus which is of a durable and reliable construction.

An even further object of the present invention is to provide a new and improved conduit support apparatus which is susceptible of a low cost of manufacture with regard to both materials and labor, and which accordingly is then susceptible of low prices of sale to the consuming public, thereby making such conduit support apparatus economically available to the buying public.

Still yet another object of the present invention is to provide a new and improved conduit support apparatus which provides in the apparatuses and methods of the prior art some of the advantages thereof, while simultaneously overcoming some of the disadvantages normally associated therewith.

Still another object of the present invention is to provide a new and improved conduit support apparatus wherein the same mounts and fixedly retains a conduit in a coaxially aligned relationship within a coaxial bore of the instant organization.

These together with other objects of the invention, along with the various features of novelty which characterize the invention, are pointed out with particularity in the claims annexed to and forming a part of this disclosure For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken along the lines 3—3 of FIG. 2 in the direction indicated by the arrows.

FIG. 4 is an orthographic view, taken along the lines 4—4 of FIG. 2 in the direction indicated by the arrows.

FIG. 5 is an orthographic view, taken along the lines 5—5 of FIG. 2 in the direction indicated by the arrows.

FIG. 6 is an orthographic view, partially in section, illustrating the instant invention mounted within a floor support member, with a conduit directed therethrough.

FIG. 7 is an isometric illustration of a modified conduit support apparatus of the instant invention.

FIG. 8 is an isometric illustration of a yet further modified conduit support apparatus of the instant invention.

DESCRIPTION OF THE PREFERRED EMBODIMENT

Figure 1:
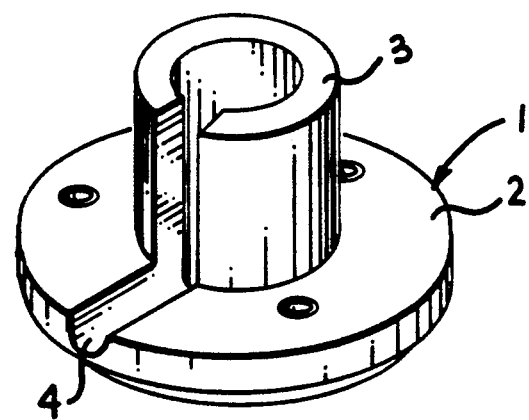
FIG. 1 is an isometric illustration of a prior art support apparatus arranged for mounting within a support wall.

With reference now to the drawings, and in particular to FIGS. 1 to 8 thereof, a new and improved conduit support apparatus embodying the principles and concepts of the present invention and generally designated by the reference numerals 10, 10a, and 10b will be described.

FIG. 1 illustrates a prior art support structure 1 that utilizes a cylindrical sleeve that is directed through a wall member for directing a cable therethrough, wherein the cable is guided and directed through the groove 4 exteriorly of the wall surface, in a manner as illustrated and set forth in U.S. Pat. No. 4,809,937.

Figure 2:
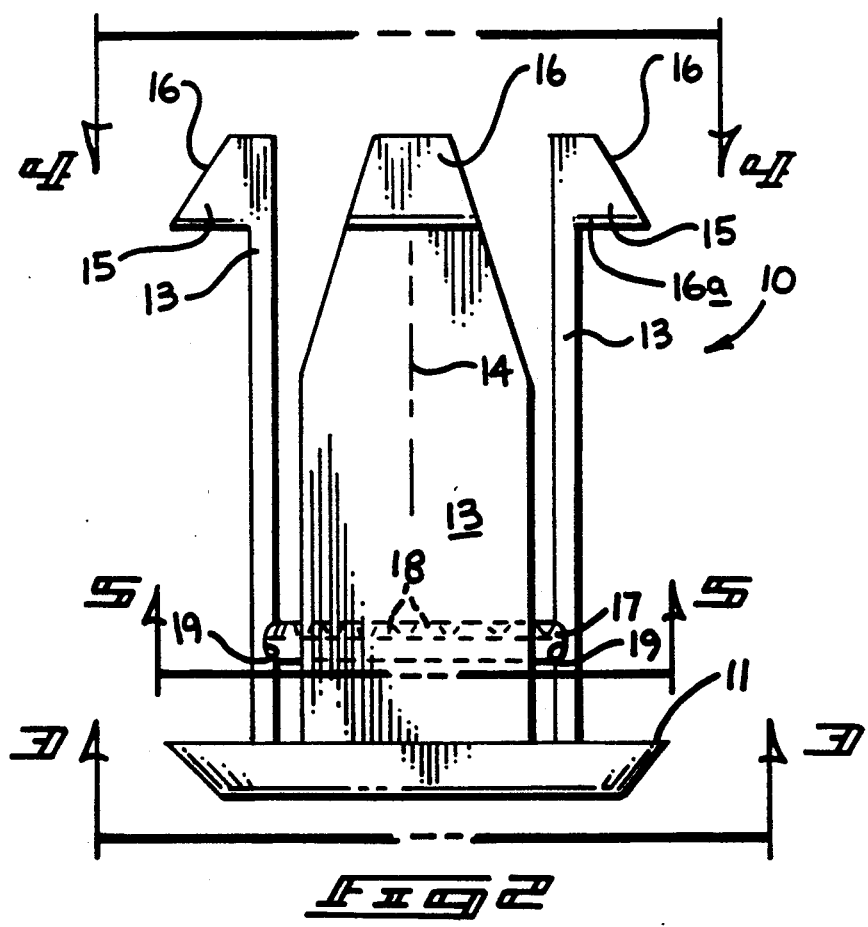
FIG. 2 is an orthographic view, taken in elevation, of the instant invention.

More specifically, the conduit support apparatus 10 of the instant invention essentially comprises a base flange 11, including a planar top surface, with an axially aligned bore 12 coaxially directed through the flange orthogonally oriented relative to the planar top surface. Plural pairs of diametrically opposed mounting legs 13 are orthogonally and integrally mounted to the planar top surface of the base flange 11 and coaxially parallel to a central axis 14 defined by the bore 12. Each mounting leg 13 includes a locking lug 15 integrally mounted to each upper terminal end of each mounting leg 13 and projecting exteriorly of each mounting leg 13, wherein each locking lug 15 includes an exterior sloping guide surface 16 defining a truncated cone of revolution about the central axis 14. A lock ring 17 is positioned within a series of concentric groove segments 19 that are formed within each interior surface of each mounting leg 13 adjacent the planar top surface 11. Each mounting leg 13 is formed of a spring-biased material of a memory retentent configuration to normally bias each mounting leg 13 into the orthogonal orientation relative to the mounting plate 11, as illustrated in FIG. 2 for example.

In this manner, in directing of the apparatus 10 through a support member relative to the floor 20, as illustrated in FIG. 6, the guide surfaces 16 bias and direct the mounting legs 13 radially interiorly relative to the axis 14 and subsequently project overlying the support member 20 when directed through a bore of the support member 20, in a manner as set forth in FIG. 6. Accordingly, a planar bottom surface 16a is defined by each locking lug 15 and defines an acute included angle between the sloping back surface 16 and the bottom planar surface 16a. FIG. 7 illustrates the use of an additional alignment bushing 20 mounted within the bore 12 of the flange 11. A further modified apparatus 10b utilizes a further locking ring 23, including the annularly aligned plate segments of a type and orientation as set forth in the lock rings 17, with each of the plate elements 18 sloping upwardly defining an acute included angle between the central axis 14 and a projection of each plate element 18 towards that axis 14. Further, an externally threaded locking stud 24 is threadedly received and radially directed through an internally threaded bore within the base flange 11 to provide further permanent securement of the conduit 21 directed through the apparatus 10b.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A conduit support apparatus arranged for mounting within a planar support structure for securing a conduit therethrough, the apparatus comprising,
    a base flange, the base flange including a planar top surface, and
    a plurality of mounting legs fixedly and orthogonally mounted to the planar top surface, each mounting leg including a locking lug fixedly mounted to each upper terminal end of each mounting leg projecting and mounted to an exterior surface of each mounting leg, and
    the base flange including a central, axially aligned bore, and the mounting legs mounted about the bore, and
    lock ring means mounted within the mounting legs for securing the conduit therewithin, and
    wherein the mounting legs are arranged in diametrically opposed pairs concentrically positioned about the axially aligned bore, and the axially aligned bore defining a central axis, with the mounting legs spaced an equal distance from the central axis, and wherein each locking lug is defined by a trapezoidal cross-sectional configuration, including an exterior sloping guide surface and a planar bottom surface, with the planar bottom surface orthogonally aligned relative to the central axis, and the planar bottom surface and the exterior sloping guide surface defining an acute included angle therebetween, and wherein each mounting leg includes a concentric groove segment directed through an interior surface of each mounting leg adjacent the base flange, and the groove segments of the mounting legs supporting the lock ring means therewithin, and the lock ring means including an annular array of plate elements angulated upwardly relative to the planar top surface of the base flange defining an acute included angle between the central axis and a projection of each plate element towards the central axis, and wherein the axially aligned bore of the base flange includes a further lock ring means mounted therewithin, wherein the further lock ring means includes a further series of lock plate elements angulated upwardly relative to the planar bottom surface and defining a further acute angle between the central axis and a projection of a further plate elements toward the central axis, and wherein the base flange includes an internally threaded bore directed through the base flange and radially aligned therethrough intersecting the axially aligned bore, and an externally threaded locking stud threadedly received within the threaded bore to enhance securement of the conduit within the axially aligned bore, and wherein each mounting leg is formed of a memory retentent material and is biased into an orthogonal orientation relative to the planar top surface.

* * * * *